Figure 1:
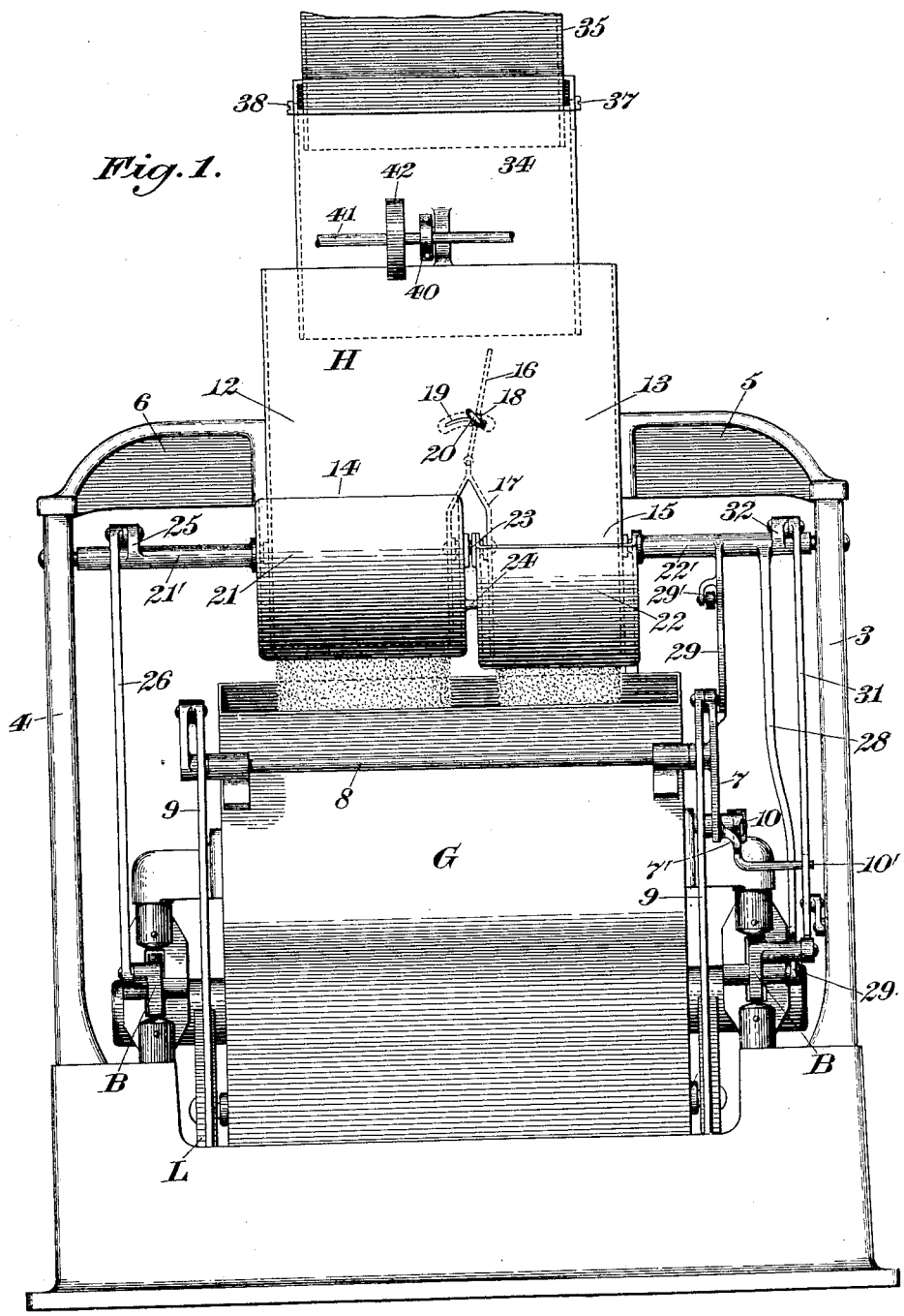

(No Model.) 4 Sheets—Sheet 1.

F. H. RICHARDS.
WEIGHING MACHINE.

No. 579,449. Patented Mar. 23, 1897.

Witnesses:
O. W. Smith
Fred. J. Dole.

Inventor
F. H. Richards.

(No Model.)  4 Sheets—Sheet 2.

F. H. RICHARDS.
WEIGHING MACHINE.

No. 579,449.  Patented Mar. 23, 1897.

Witnesses:
O. W. Smith
Fred. J. Dole.

Inventor:
F. H. Richards.

(No Model.) 4 Sheets—Sheet 3.

F. H. RICHARDS.
WEIGHING MACHINE.

No. 579,449. Patented Mar. 23, 1897.

Witnesses:
O. W. Smith
Fred. J. Dole

Inventor,
F. H. Richards.

(No Model.) 4 Sheets—Sheet 4.
F. H. RICHARDS.
WEIGHING MACHINE.
No. 579,449. Patented Mar. 23, 1897.
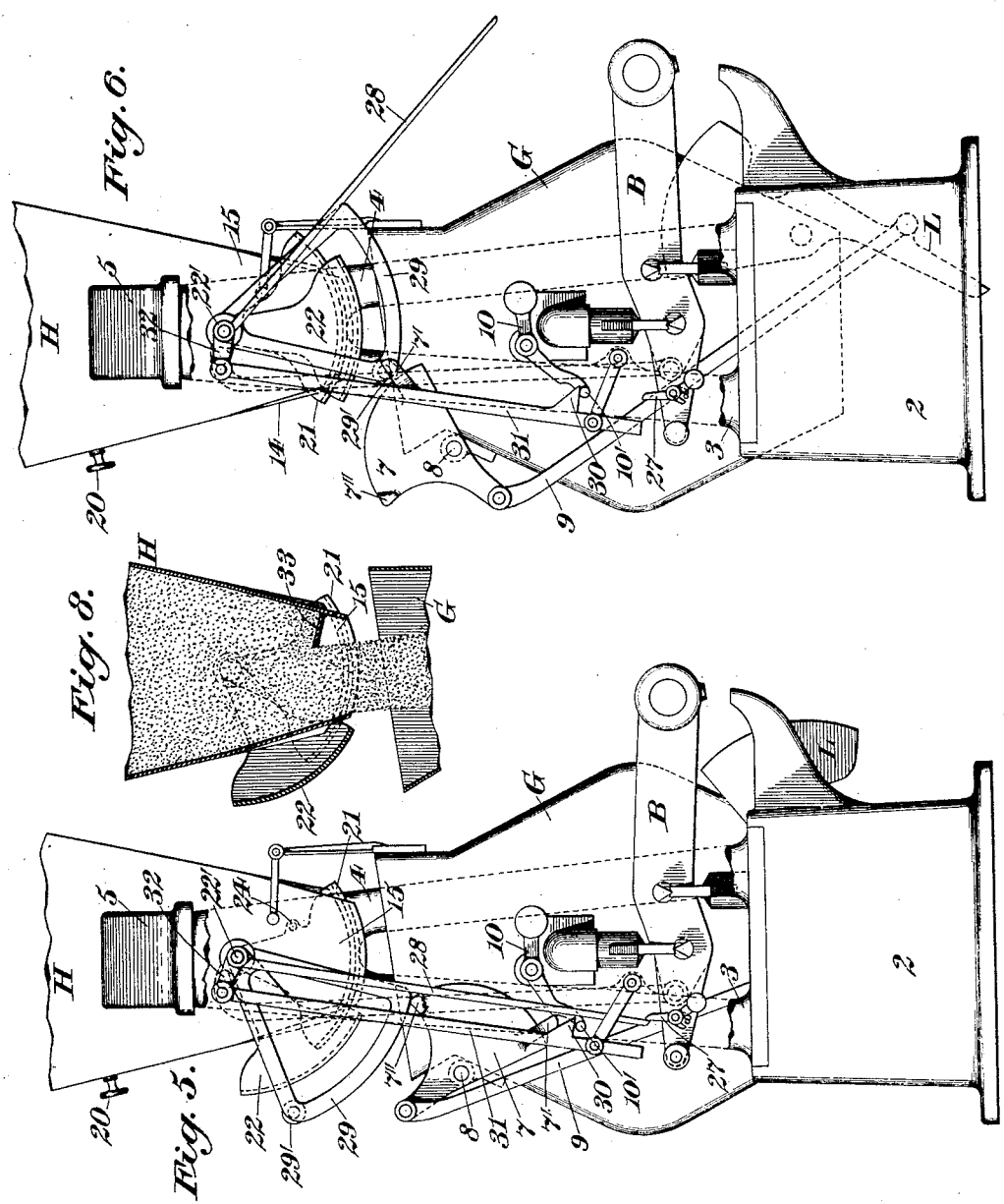
Witnesses:
O. W. Smith
Fred. J. Dole
Inventor,
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 579,449, dated March 23, 1897.

Application filed October 29, 1896. Serial No. 610,419. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering various classes of free-running materials, it being more especially intended, however, for weighing such substances as rolled oats and rolled wheat in relatively small lots or charges for subsequent packing in suitable cases.

With respect to one of its objects the invention includes improved stream-supply means comprehending a chambered hopper, one of the chambers being intended to contain and deliver a comparatively large body of material to the bucket or load-receiver to form the major part of a load, the other chamber supplying a drip-stream, and the outlets of said hopper will be preferably controlled by a pair of stream controllers or valves governed by the weighing mechanism and which are successively closable, so that when the main valve, which first closes, has been shut the main chamber of the hopper may be filled, the supplemental valve remaining open to permit the passage of a drip-stream into the bucket to top off the partial load therein. The two valves will be opened simultaneously, the main valve on opening permitting the main charge, which has been stored in the main chamber of the hopper, to drop into the bucket, and by this organization of devices the work of the machine may progress without interrupting the supply to the hopper, by which it will be evident that the output of the machine is largely increased.

Another object of the invention is to provide, in connection with weighing mechanism, stream-supply means and a stream-controller-actuating means operable for blocking the action of the weighing mechanism and which organization I may employ in combination with the foregoing.

In the form shown the stream-controller consists of a valve, and the weighing mechanism will be blocked on the opening of said valve, so that when the empty bucket has reached the limit of its upstroke the return thereof will be temporarily opposed to prevent the rapid descent of said bucket to a point below the poising-line and the consequent discharge of the load when the main charge is discharged bodily into the bucket.

Figure 3:
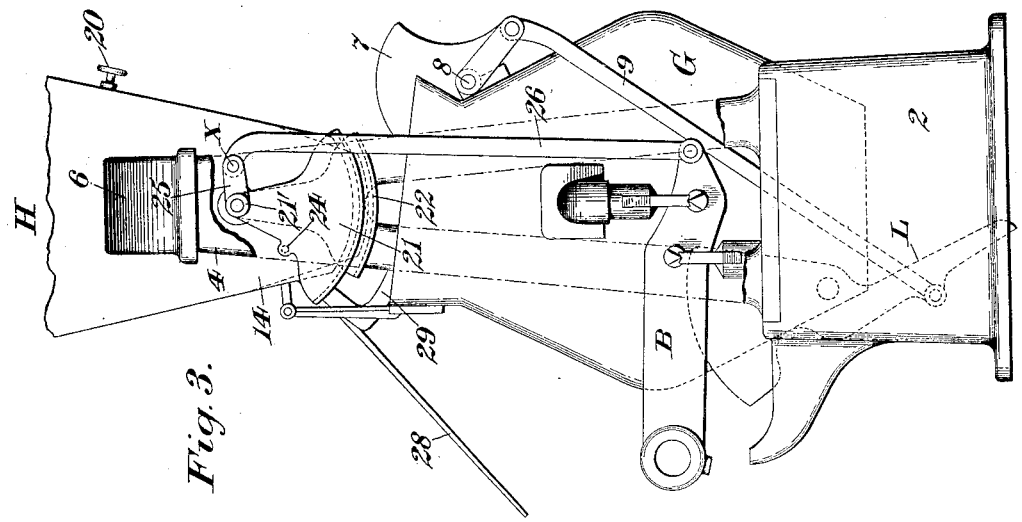
Figure 2:
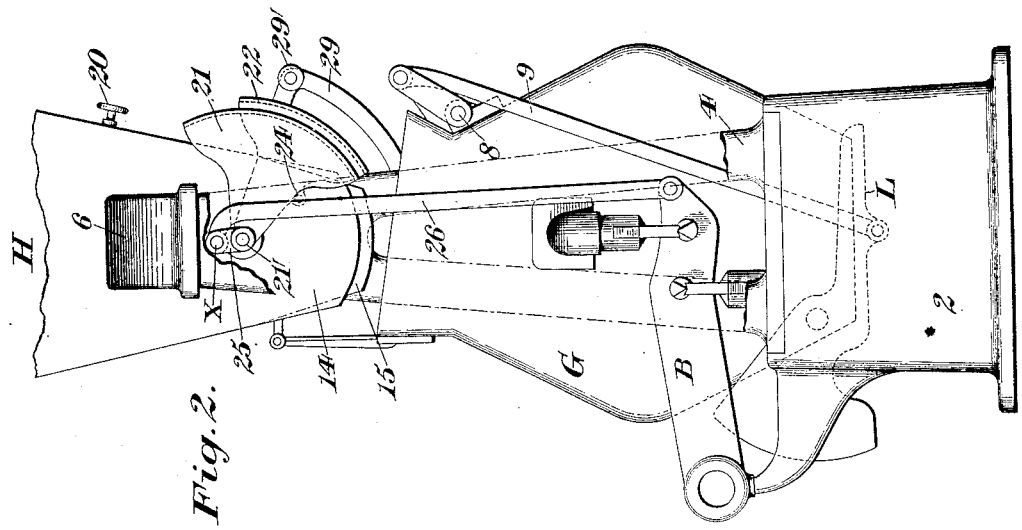
Figures 4, 7:
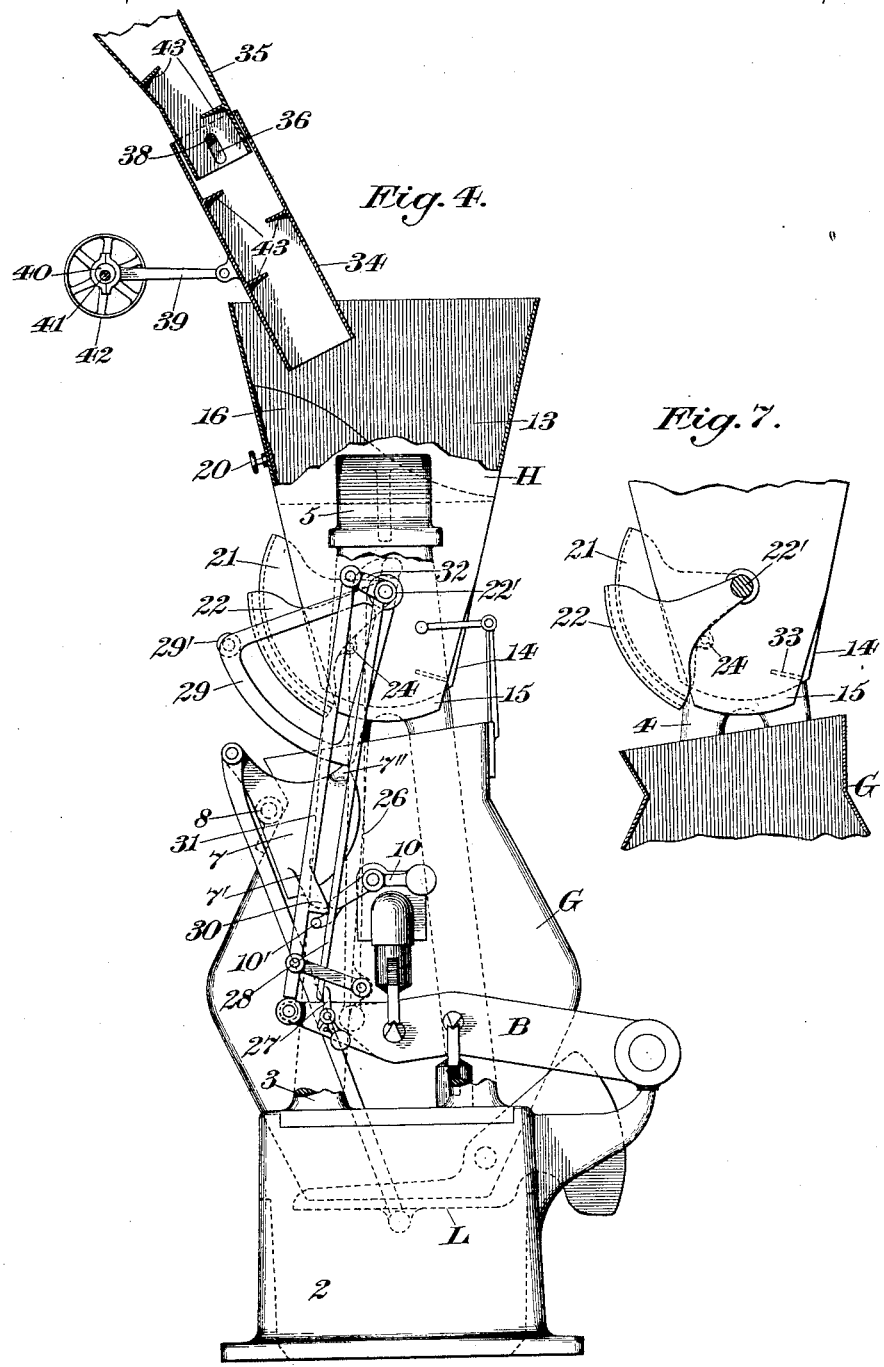

In the drawings accompanying and forming part of this specification, Figure 1 is a rear elevation of a weighing-machine embodying my present improvements, both of the valves being in their wide-open positions to permit the passage of the supply to the bucket. Fig. 2 is an end elevation as seen from the left in Fig. 1, a portion of the hopper being removed and the operative parts being in positions corresponding with said figure. Fig. 3 is a view similar to Fig. 2, the valves having been closed and the closer being open to permit the discharge of the bucket contents. Fig. 4 is a sectional end elevation as seen from the right in Fig. 1. Figs. 5 and 6 are views similar to Fig. 4, the upper part of the hopper being removed, and showing the positions occupied by the working parts at the commencement of the drip period and during the load-discharging period, respectively. Figs. 7 and 8 are detail views, in end elevation and vertical section, respectively, of a portion of the hopper and the valves therefor, a fragment of the bucket being illustrated in section.

Similar characters designate like parts in all the figures of the drawings.

The weighing mechanism is substantially similar in operation to that disclosed by Letters Patent No. 548,840, granted to me October 29, 1895, to which reference may be had, and includes a load-receiver or bucket and a supporting scale-beam, to be hereinafter more particularly described.

The framework for supporting the various parts of the apparatus consists of a chambered supporting-base 2 and the end frames or columns 3 and 4 rising therefrom, to which end frames are connected at the top the brackets 5 and 6, laterally extending from the supply-hopper H, to be hereinafter more specifically described.

The scale-beam is designated by B and is fulcrumed on the base 2, it consisting of a pair of parallel arms joined at the rear by a weight which is borne, when the machine is at rest, by suitable supports extending from the base, each of the beam-arms being furnished with a suitable support for the bucket.

The bucket or load-receiver is designated by G and has the usual discharge-outlet, which is controlled by the closer L, said closer being pivotally connected to the bucket at one side of its discharge-outlet.

The closer consists of a flat plate which is contiguous to the lower edge of the bucket when in its normal position, and it will be suitably counterweighted, the office of the counterweight or counterweights being to return the closer to the normal or shut position thereof on the discharge of a bucket-load.

A rocker is represented at 7, it being affixed to the rock-shaft 8, which is supported near the upper rearward side of the bucket G, said rocker having pivoted thereto the connecting-rod 9, which is likewise attached to the closer L, said rocker and connecting-rod forming an inverted toggle whereby when said rocker is engaged by a suitable holding or restraining device the closer may be maintained in its shut position by a minimum expenditure of power.

The holding device for the rocker 7, and consequently the closer L, consists of a counterweighted latch 10, which swings upward to engage the coöperating arm 7' of the rocker to hold the closer in its shut position, (see Fig. 5,) it being understood that the rocker 7, and consequently the closer L, will be released by a downward pressure or thrust on the latch 10.

The supply-hopper H is divided into two chambers 12 and 13, which terminate in or lead to the spouts 14 and 15, respectively, the partition 16, which separates the same, being adjustable, suitable means being employed for holding said partition in position when adjusted.

The partition 16 is in the form of a flat plate pivotally connected to the apex of the dividing-wall 17, which separates the two spouts 14 and 15, and it has at a suitable point thereon the screw or threaded stud 18, which passes through the curved slot 19 in the rear wall of the hopper, said screw being embraced by the thumb-nut 20, which is adapted to bind against the outer face of the rear wall of the supply-hopper to maintain the partition in a position in which it may have been set.

On reference to Fig. 1, which shows the partition or plate 16 in a set position, it will be evident that by manipulating the thumb-nut 20 the said plate may be swung in either direction to vary the volume of the drip-stream proportionately to the main supply, it being necessary to change the disposition of said plate to suit different conditions of work.

The valves for the hopper H will be supported for movement across the respective orifices of the two spouts 14 and 15, said valves being of the oscillatory type. The main valve, which controls the discharge of material from the main chamber 12, is designated by 21, and the supplemental or drip valve, which controls the passage of material from the auxiliary or drip chamber 13, is designated by 22, said valves having the projecting arms 21' and 22', which are furnished with openings in their outer ends for receiving suitable journals carried by the framing of the machine, said valves being also loosely movable at their inner ends about the pivot 23, which extends between the opposite portions of the double wall 17.

The two valves will be successively closable, the main valve closing first, so that when it is shut the main chamber 12 will be filled with material, which can then flow over into the adjoining or communicating drip-chamber 13, and, if the drip-valve 22 be open, pass into the bucket; but if the drip-valve should be closed said material will be stored in the drip-chamber until the said valve is opened.

The two valves tend to be self-closing, they having a preponderance of weight below their axes for this purpose, and the main valve 21 will be operable for opening the companion or drip valve. Said main valve is furnished with the laterally-projecting stud 24, against which the drip-valve 22 is adapted to abut when the latter has reached the end of its cut-off stroke, so that on the opening of the main valve 21 by its actuating means the supplemental or drip valve will be caused to move therewith.

The means for opening the main valve include the crank-arm 25, which extends from the arm 21' of said valve, the rod 26, and the scale-beam B, said rod being pivotally connected, respectively, to said crank-arm and beam, the rod and crank-arm forming a deadlock toggle and being operable for temporarily limiting the descending movement of the weighing mechanism whenever the several centers or pivots are thrown into line by the rise of the scale-beam and the concurrent opening of the valve.

The two valves 21 and 22 being in their closed positions, as indicated in Fig. 3, and the beam B and bucket G being down, it will be assumed that the closer L is shut, as shown in Fig. 2, thereby permitting the empty bucket and the scale-beam to rise, so that the latter will thrust the rod 26 upward, thereby rocking the crank-arm 25 and the valve-arm 21' in a corresponding direction, so that the main valve 21 will be forced or swung open to release the stored supply in the main chamber of the hopper H, the mass then dropping bodily into the empty bucket.

It will be seen on an inspection of Fig. 3 that the several pivots or centers of the toggles 25 and 26 are out of line, and as the bucket and beam rise in the manner just alluded to the three pivots or centers of said toggles will be instantly forced into alinement, and at about the time the first part of the discharged contents reaches the closer L, which is then in its latched position, the three pivots will be in alinement, so that the bucket is momentarily prevented from dropping, which would immediately be the case were it not for the dead-lock toggle, which is effective for an inappreciable period of time.

The weighing mechanism will be released by the action of the main valve in closing, which on its initial movement breaks the toggle-joint at the point $x$, thereby unlocking the weighing mechanism and permitting it to descend to a point above and near the poising-line with the nearly-completed load. As the weighing mechanism descends the beam B thereof will draw the rod 26 downward, thereby further closing the valve 21.

It will be observed that as the bucket and the beam rise in unison the rod 26 will be thrust upward by the beam, which results in opening the valve and throwing the several toggle-centers into alinement. At about this time the major part of the load stored in compartment 12 of the hopper has been received by the bucket, and hence the forces which play an important part in these machines will have exerted their maximum combined influences about the time that the toggle members are in line, so that the bucket cannot be carried down too soon, and therefore momentarily resists the shock of the falling load from said compartment 12. Within a very short, almost inappreciable, space of time, however, or almost simultaneously with the act of throwing the toggle-centers into line, the toggle-joint is broken at the point $x$ by the action of the main valve, which constantly tends to close by gravity, and the rod 26, being laterally movable at its upper end, permits this operation, so that the bucket and beam can descend with comparative rapidity, and the beam will then act through said rod to close the main valve.

The drip-valve 22 will be normally held in its wide-open position to permit the unobstructed passage of the drip-stream into the bucket, and for this purpose the following means may be employed: A relatively long rod or bar is shown at 28, oscillatory with the drip-valve 22 and rigidly joined to the arm 22' thereof, the lower end of said rod being engaged by the by-pass stop 27, which is carried by the beam B near its poising side, said by-pass being counterweighted and suitably restrained from action during its effective period. When the beam B passes below the poising-line, indicating the completion of the bucket-load, the by-pass stop 27 will be disconnected from the rod 28, so that the valve 22 is free to close, which operation is a very quick one for instantly cutting off the drip-stream. As the drip-valve is opened the rod 28 will be moved therewith and its free end will strike the upper arm of the by-pass stop and swing the latter ineffectively about its axis, following which the by-pass will be caused to return to its normal position by its counterweight to again engage said rod.

In connection with the drip-valve 22 and the closer L, I employ reciprocally-effective stops operative, respectively, for preventing the opening of the closer when the valve is open and for preventing the opening of said valve while the closer is open and any part of the load is being discharged, it being understood that the main valve 21 will be also held closed by the stop mechanism.

The rocker 7 serves as the closer operative stop, and the other stop is designated by 29, the latter being in the form of an open segment rigid with the valve-arm 22'. The rocking stop 7 is furnished with an auxiliary stop 7'' in the form of a boss at one end of its curved face, while the coacting stop 29 is also provided with an auxiliary stop or projection 29', consisting of an antifriction-roll.

The operation of the two stops will be apparent from an inspection of Figs. 5 and 6.

In Fig. 5 the valve 22 is illustrated in its wide-open position, and the boss 7'' is approximately contiguous to the curved face of the stop 29, so that if the latch 10 should have been tripped too quickly the stop 7 may rock for a very limited distance or until it meets the companion stop 29, which arrests its further progress and continues to do so until the valve 22 has reached its cut-off position, at which time the stop 29 will have crossed the plane of curvature of the rocking stop 7, so that the latter is free to swing about its center, provided its holding-latch 10 has been tripped, and in so doing its curved face will run substantially in contact with the roll 29', as indicated in Fig. 6, whereby retractive or opening movement of the valve will be prevented.

When the closer L reaches its normal position, the rocking stop 7, which is connected thereto, will release the stop 29, and consequently the drip-valve 22, so that the latter may be opened in the manner hereinbefore set forth.

The latch 10 is provided with a relatively long pin 10', which is disposed in the path of movement of a suitable tripper, the latter being herein shown as a fixed projection 30 on the reciprocatory rod 31, said rod being pivoted to the crank-arm 32 on the valve-arm 22' and also suitably connected to the framing of the machine.

When the valve 22 is freed by the stop 27, to cut off the drip-stream, the rod 31 will be thrust rapidly downward, and the tripper or projection 30 thereof will be caused to impinge against the pin 10' of the latch-tripper, pressing said latch down and disengaging it from the arm 7' of the rocker, said latch being thus tripped after the valve has cut off the drip-stream. When the latch is thus disengaged, the closer L will be released and will then be forced open by the weight of the load within the bucket.

I dispose within the supplemental or drip chamber a check or stream-brake plate 33, (see Fig. 8,) which is located at a point opposite to that from which the drip-valve travels in closing, said plate extending from the front wall of the chamber and being adapted to break the force of impact of the gravitating stream of material from the hopper, whereby the mass is prevented from acting directly against the discharge edge of the valve when the latter has nearly reached its cut-off position, as in such case the complete closure of the valve would be so retarded as to cause an overloading of the bucket.

For constantly supplying the hopper H with material I employ the inclined chute 34, which leads into said hopper and which is connected to the pipe 35 for longitudinal adjustment, a fragment of said pipe being shown in Figs. 1 and 4. The chute 34, near the upper end thereof and in its opposite walls, has elongated slots, one of which is illustrated at 36 and through which pass the adjusting-screws 37 and 38, fixed to the pipe or conduit 35, so that by adjusting the chute relatively to the hopper the holding capacity of the latter may be properly regulated, whereby in case an attendant should neglect the machine the hopper may be prevented from filling and overflowing.

For promoting the free descent of the material through the chute 34 I vibrate or shake the same; and for effecting this operation I attach the eccentric-rod 39 to said chute, the eccentric being shown at 40, its shaft at 41, and a driving-pulley at 42, and the latter may be operatively connected by a belt to a suitable motor. (Not shown.)

For preventing the too-rapid flow of the material as it passes through the chute 34 I arrange the check-plates 43 therein, said plates being oppositely disposed and properly spaced so as to retard the downflowing stream at successive points in its passage toward the hopper H and to throw the same sidewise for modifying its momentum.

The operation of the hereinbefore-described machine is as follows: Attention is invited to Fig. 3, wherein the bucket G is shown down and in the act of discharging a load. As the bucket rises the rod 26 will be thrust upward by the action of the beam B, which ascends with the bucket, so that the several pivots of the rod 26 and the crank-arm 25 on the valve-shaft 21' will be thrown into line, and during this movement the main valve 21 will be forced open. As the main valve opens, the projecting stud 24 thereof being against the adjacent drip-valve 22, the latter will be opened, the two valves being shown in their wide-open positions in Fig. 2, wherein the weighing mechanism is shown in its locked position by the toggle members 25 and 26.

The weighing mechanism being momentarily blocked, the stored or accumulated charge from the main chamber 12 then drops into the bucket, and at about this time the main valve 21 will start to close, thereby throwing the several pivots or centers of the toggle members 25 and 26 out of line, as illustrated in Fig. 5, so that the bucket and beam may descend to a point near the poising-line, when the main valve is fully closed. During this period of the operation the drip-valve 22 has been held in its wide-open position by the by-pass stop 27, which is in engagement with the free end of the rod 28. The main valve having been closed, as specified, the load is completed by the drip-stream. On the completion of the load the scale-beam B will pass below the poising-line, so that the by-pass stop 27 thereon will descend clear of the rod 28, following which the drip-valve 22 will be instantly closed. When the rod 28 and valve 22 are thus released, the reciprocatory rod 31 will be thrust downward by the drip-valve with its projection or latch-tripper 30 into contact with the pin 10' of the latch 10, so that the latch will be tripped and disengaged from the rocker-arm 7', thereby releasing the closer L, so that the latter will be forced open by the weight of the contents within the bucket. On the discharge of the load the several parts will resume their normal positions.

Having described my invention, I claim—

1. The combination with weighing mechanism, of a hopper having two spouts and also having a slot in a wall thereof; a swinging partition hinged to the dividing-wall of said spouts and provided with a screw passing through said slot; a nut on said screw; and stream-controlling means governed by the weighing mechanism.

2. The combination with weighing mechanism, of stream-supply means; a stream-controller; and stream-controller-actuating means controlled by the weighing mechanism and operable for blocking the descending movement of the weighing mechanism.

3. The combination with weighing mechanism, of stream-supply means; a valve; and valve-actuating means controlled by the weighing mechanism and operable for blocking the descending movement of the weighing mechanism.

4. The combination with weighing mechanism, of stream-supply means; a valve; and valve-opening means controlled by the weighing mechanism and operable for blocking the descending movement of the weighing mechanism.

5. The combination with weighing mechanism, of stream-supply means; a stream-controller; and stream-controller-actuating means controlled by the weighing mechanism and operable for blocking the descending movement of the weighing mechanism, said stream-controller being operable for releasing the weighing mechanism.

6. The combination with weighing mechanism consisting of a scale-beam and a bucket supported thereby for rising and falling movements; of a valve-actuator controlled by the scale-beam, for blocking the descent of the weighing mechanism on one of the strokes of said scale-beam.

7. The combination with weighing mechanism consisting of a scale-beam and a bucket supported thereby for rising and falling movements; of a valve-actuator controlled by the scale-beam, for blocking the action of the weighing mechanism on the ascending stroke of the scale-beam.

8. The combination with weighing mechanism, of a hopper; a valve supported for oscillatory movement; and valve-opening means controlled by the weighing mechanism for blocking the descent of the weighing mechanism.

9. The combination with weighing mechanism, of a hopper; a valve supported for oscillatory movement; and valve-opening means controlled by the weighing mechanism and operable for blocking the descent of the weighing mechanism, said valve being adapted on its closure to release the weighing mechanism.

10. The combination with weighing mechanism, of stream-supply means; a stream-controller; and stream-controller-actuating means controlled by the weighing mechanism and operable for blocking the action of the weighing mechanism, said means including a toggle.

11. The combination with weighing mechanism comprehending a bucket and a supporting scale-beam therefor, of stream-supply means; a stream-controller; and a toggle operatively connected with the stream-controller and the scale-beam and adapted to have its pivots thrown into line on one of the strokes of the scale-beam to thereby block the action of the weighing mechanism.

12. The combination with weighing mechanism including a bucket, of a hopper having main and drip chambers; valves adapted for controlling the supply of material from said chambers to the bucket, the valve for the main chamber being closed first, whereby when it is shut said main chamber may be filled with material; and means controlled by the weighing mechanism for opening said valves, whereby the stored mass in the main chamber will be released, said valve-opening means being also operable for blocking the action of the weighing mechanism.

13. The combination with weighing mechanism including a bucket, said bucket having a closer normally held against movement by means comprehending a latch; of a hopper having main and drip chambers; valves adapted for controlling the supply of material from said chambers to the bucket, the valve for the main chamber being first closed, whereby when it is shut said main chamber may be filled with material; means controlled by the weighing mechanism for opening the main valve to release the stored mass in the main chamber, said valve-opening means being also operable for blocking the action of the weighing mechanism; a latch-tripping device; and reciprocally-effective stops operative with the drip-valve and with the closer.

14. The combination with weighing mechanism including a bucket, said bucket having a closer normally held against movement by means comprehending a latch; of a hopper having main and drip chambers; valves adapted for controlling the supply of material from said chambers to the bucket, the valve for the main chamber being first closed, whereby when it is shut said chamber may be filled with material; means for opening the main valve to release the stored mass in the main chamber, said valve-opening means being also operable for blocking the action of the weighing mechanism; and a latch-tripper operative with the drip-valve.

15. The combination with weighing mechanism including a bucket, said bucket having a closer normally held against movement by means comprehending a latch; of a hopper having main and drip chambers; valves adapted for controlling the supply of material from said chambers to the bucket, the valve for the main chamber being first closed, whereby when it is shut said main chamber may be filled with material; means for opening the main valve to release the stored mass in the main chamber, said means being also operable for blocking the action of the weighing mechanism, said main valve having a projecting stud thereon adapted to engage the drip-valve to open the same; and a latch-tripping device.

16. The combination with weighing mechanism including a bucket, said bucket having a closer normally held against movement by means comprehending a latch; of a hopper having main and drip chambers; valves adapted for controlling the supply of material from said chambers to the bucket, the valve for the main chamber being first closed, whereby when it is shut said main chamber may be filled with material; means for opening the main valve to release the stored mass in the main chamber, said valve-opening means being also operable for blocking the action of the weighing mechanism; a latch-tripper connected to said supplemental valve; reciprocally-effective stops operative, respectively, with the drip-valve and with the closer; and means for normally maintaining said drip-valve in its wide-open position.

17. The combination, with weighing mechanism including a load-receiver, of a hopper; a valve for said hopper; means controlled by the weighing mechanism, for actuating said valve; an inclined tubular chute leading into said hopper and having therein a series of oppositely-projecting plates alternately disposed on its front and rear walls, respectively; and positively-actuated means for vibrating said chute.

18. The combination, with weighing mechanism including a load-receiver, of a hopper; a valve for said hopper; means controlled by the weighing mechanism, for actuating said valve; an inclined, tubular, adjustably-supported chute leading into said hopper and having therein a series of oppositely-projecting plates alternately disposed on its front and rear walls, respectively; and an eccentric connecting-rod for vibrating said chute.

FRANCIS H. RICHARDS.

Witnesses:
 FRED. J. DOLE,
 F. N. CHASE.